Figure 1:
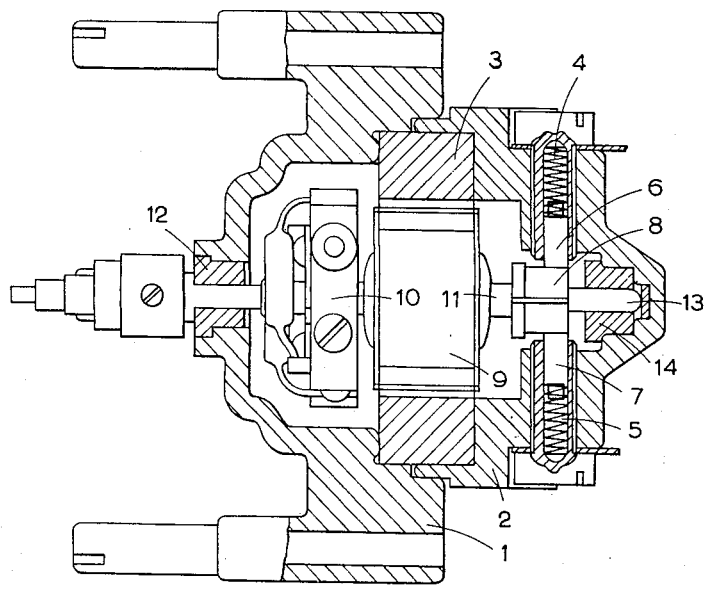

Nov. 13, 1962     H. E. BARNES     3,064,150
ELECTRIC MOTORS
Filed May 19, 1958

Inventor
H. E. Barnes
By Glascock Downing Seebold
Attys.

United States Patent Office 3,064,150
Patented Nov. 13, 1962

3,064,150
ELECTRIC MOTORS
Harold Ernest Barnes, Iver Heath, England, assignor to Electric & Musical Industries Limited, Hayes, Middlesex, England, a company of Great Britain
Filed May 19, 1958, Ser. No. 736,055
Claims priority, application Great Britain May 23, 1957
7 Claims. (Cl. 310—154)

This invention relates to electric motors of the kind operated by a direct current supply.

In one form of direct current motor which is particularly suitable for driving a turntable of battery operated gramophone record playing apparatus, the motor comprises a field magnet of circular ring shape which is permanently magnetised along a diameter of the ring, and a tripolar armature which is convenient for the purpose of economy in the cost of winding the coils of the armature. Such an arrangement of a permanent magnet and armature has, however, a disadvantage in that the magnetic poles are localised at the ends of said diameter of the ring magnet and the reluctance of the magnetic circuit in the motor is considerably less when one of the armature poles is in alignment with the direction of magnetisation of the permanent magnet than when one of the armature poles is transverse to said direction. Thus when the motor is de-energised the armature will always come to rest in one of the positions of minimum reluctance of the magnetic circuit, and when the motor is energised the torque developed to drive the armature fluctuates in accordance with the angular position of the armature being a maximum when a pole of the armature is moving away from the immediate vicinity of a pole of the magnet. These fluctuations in the torque called the cogging torque cause corresponding fluctuations in the speed of the armature and may cause the armature to rotate with an impulsive movement instead of at a constant speed. It will be appreciated that such impulsive movement is particularly undesirable in a motor which is employed to drive the turntable of gramophone record playing apparatus.

The object of the present invention is to provide a direct current electric motor comprising an armature having a plurality of poles and a stator having a plurality of poles wherein the aforesaid cogging torque is reduced.

According to one feature of the present invention there is provided a direct current electric motor comprising an armature having a plurality of poles and a stator having a plurality of poles wherein the radial extent of the air gap between the armature and stator poles when opposite to one another is a maximum at the centres thereof and decreases away from said centres, whereby the cogging torque is less than would be the case if the radial extent of said air gap was constant. Preferably the peripheries of the armature poles lie on a right circular cylindrical surface whilst the stator is a closed field magnet having an opening of elliptical cross section, and the poles thereof are disposed at the ends of the major axis of said elliptical cross section.

According to another feature of the present invention there is provided a direct current electric motor comprising an armature having a small number of poles, say three, the peripheries of which lie on a right circular cylindrical surface, and a stator in the form of a closed field magnet having an opening of elliptical cross section, and permanently magnetised so as to set up poles at the ends of the major axis of said elliptical cross section.

By making the radial extent of the air gap between poles of the armature and stator a maximum at the centres thereof the torque developed to drive the armature is more uniform than would be the case if the radial extent of said air gap were constant since the torque required to move the armature when a pole thereof is opposite a stator pole is relatively reduced, and the armature therefore rotates at a more constant speed. However the increase in the radial extent of the air gap in the vicinity of the centres of poles also has the effect of reducing the torque which can be developed by the armature. This effect is preferably compensated for by increasing the number of ampere turns of the armature windings. It is possible that as a result of the substantially constant speed of the armature there is a reduction in the frictional force acting on the armature at its bearings over the corresponding frictional force which acts when the armature rotates impulsively and since in a small battery operated motor overcoming the friction at the armature bearings constitutes a large percentage of the work done by the battery such a reduction would result in an increase in the efficiency of the motor. The net effect of the arrangement of the invention together with the compensating increase in ampere turns of the armature is found to be a substantial increase in the efficiency of the motor, such increase being particularly marked when the armature has a small number, such as three, poles. It is believed that the increase in efficiency is partly due to a reduction in friction at the armature bearings, and furthermore that this efficiency increase enables the amperage applied to the armature coils to be reduced for the same speed of rotation thereof, and by this reduction efficiency is still further increased by virtue of the associated reductions in copper losses and hysteresis losses.

Figure 2:
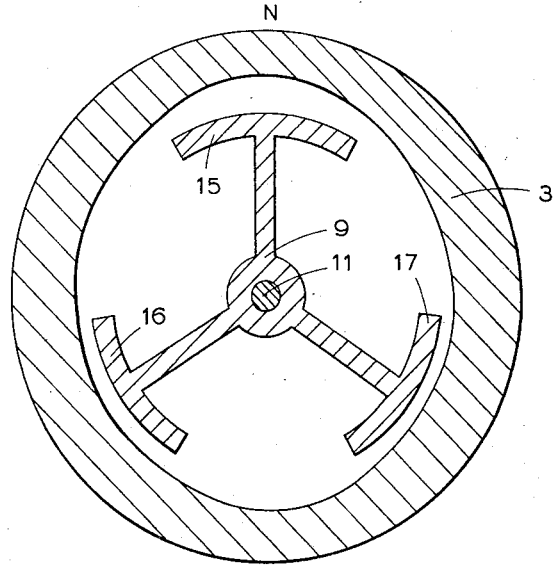

In order that the invention may be clearly understood and readily carried into effect, it will now be more fully described with reference to the accompanying drawings, in which:

FIGURE 1 shows, partly in cross section, an electric motor in accordance with an embodiment of the invention, and FIGURE 2 shows a cross sectional view of the armature and stator of the motor of FIGURE 1.

Referring to FIGURE 1 of the drawings the motor comprises a housing formed in two sections 1 and 2 which are preferably injection moulded. A stator in the form of an annular transversely magnetised permanent magnet 3 is arranged to fit tightly in the section 1 and loosely in the section 2, said section 2 being provided with substantially diametrically opposite radial apertures in which are mounted helical springs 4 and 5 attached respectively to brushes 6 and 7. The brushes 6 and 7 make contact with the elements of a commutator 8 which is mounted coaxially with an armature 9 disposed substantially centrally in the field of the magnet 3. On the side of said armature 9 opposite to the commutator 8 is mounted a governor assembly 10 to govern the speed of operation of the motor. The commutator 8, armature 9 and governor assembly 10 are mounted on a shaft 11 which projects through a substantially central aperture in the section of the housing, said aperture being provided with a suitable bearing 12 for the shaft 11. At the end of said commutator 8 remote from the armature 9 there projects a second shaft 13 which may be separated from or form a part of said shaft 11, but is in any case substantially coaxial therewith, said shaft 13 being maintained in a bearing 14 provided in the section 2 of the housing. The two sections 1 and 2 of the housing are arranged to be relatively rotatable in order to adjust for proper commutation by effecting relative angular movement between the brushes 6 and 7 and the poles of the magnet 3.

As shown in FIGURE 2 of the drawings in the present embodiment of the invention the armature has three poles 15, 16 and 17 and the motor is for example, suitable for driving the turntable of battery operated gramophone record playing apparatus. The three poles 15, 16 and 17 are angularly separated from one another by 120°, and the peripheries thereof are arranged to lie on a right circular cylindrical surface. Each pole carries a coil (not shown) and the three coils are connected in star formation and to the commutator in known manner. The shaft 11 on which the armature 2 is mounted is, in the present example, arranged to drive the turntable of said gramophone record playing apparatus. The annular permanent magnet 3 has an opening of elliptical cross section the direction of magnetisation of said magnet being given by the arrow 18. Thus the magnetic axis of said permanent magnet 3 is concident with the major axis of said elliptical cross section, the north and south poles of said magnet being located at N and S respectively.

In the drawing the armature pole 15 is shown opposite the magnetic north pole N and it will be appreciated that by virtue of the particular shapes of the opposite surfaces thereof the radial extent of the air gap therebetween is a maximum at the centres of said poles and decreases away from said centres. By a suitable choice of the relative lengths of the the major and minor axes of the elliptical opening and the extent of the armature poles a suitable variation of said radial extent can be achieved such that the cogging torque is reduced. The magnet 3 with its elliptical opening serves to enable a substantially constant reluctance of the magnetic circuit to be obtained irrespective of the armature position. In one particular example of a motor for operation over a voltage range of 4½–9 volts the magnet 3 has a length of .375" and the dimensions of the elliptical opening along its major and minor axes are respectively .810 inch and .770 inch the external periphery of the magnet being circular in cross section and having a diameter of approximately 1.25 inches. The diameter of the armature is .703 inch whilst the angular extent of each of the poles 15, 16 and 17 is 85° and the coils thereof each comprise 120 turns. The flux density of the magnet is about 8,500 lines per square centimetre at the poles. It has been found that the efficiency of a motor as described above is approximately 25% to 35% over the voltage range referred to above as compared with an efficiency of 15% to 20% for a similar motor over a similar voltage range having a magnet with a circular aperture.

The present invention has been particularly described with reference to an electric motor suitable for driving the turntable of battery operated gramophone record playing apparatus but can be applied to direct current motors designed for other purposes. If desired the magnet 3 may have an external elliptical shape with a constant cross-sectional thickness.

What I claim is:

1. A direct current electric motor comprising a stator in the form of a ring magnet having an opening and a plurality of poles arranged around said opening, and an armature arranged within said opening, and having a plurality of poles, the number of poles on the stator and armature being small so as to tend to introduce a cogging torque, energising windings associated with said armature poles, the energising windings being connected in star formation, and the shape of said opening, and the external configuration of said armature poles are such that in a plane normal to the axis of said armature the radial extent of the air gap between said armature poles and said stator poles, when opposite to one another, is a maximum at the centres thereof and decreases away from said centres so that said cogging torque is substantially reduced.

2. A direct current electric motor according to claim 1 wherein said opening is of elliptical cross section and said stator poles are disposed at the ends of the major axis of said elliptical cross section.

3. A direct current electric motor according to claim 2 wherein the peripheries of said armature poles lie on a right circular cylindrical surface.

4. A direct current electric motor according to claim 2 wherein said ring magnet is permanently magnetised to set up said stator poles.

5. A direct current electric motor according to claim 4 wherein the external surface of said stator is circular.

6. A direct current electric motor comprising a stator in the form of a closed field magnet having an opening of elliptical cross section and permanently magnetised to set up poles at the ends of the major axis of said elliptical cross section, and an armature arranged within said opening, and having three poles and energising windings associated with said poles, the energising windings being connected in star formation, and the peripheries of the armature poles lie on a right circular cylindrical surface, such that in a plane normal to the axis of said armature the radial extent of the air gap between said armature and stator poles when opposite to one another is a maximum at the centres thereof and decreases away from said centres so that said cogging torque which might otherwise be introduced due to the small number of poles is substantially reduced.

7. A direct current electric motor comprising a stator in the form of a ring magnet having an opening and a plurality of poles arranged around said opening, a wound armature having a plurality of poles, the number of poles on the stator and armature being small so as to tend to introduce a cogging torque, and an armature winding circuit including windings associated with said poles and a commutator responsive to rotation of the armature for commutating input current to said windings in a cyclic order, the shape of said opening and the external configuration of said armature poles being such that in a plane normal to the axis of said armature the radial extent of the air gap between said armature and stator poles when said poles are opposite to one another is a maximum at the centres thereof and decreases away from said centres, so that the tendency to the introduction of a cogging torque is substantially reduced.

References Cited in the file of this patent

UNITED STATES PATENTS

| 496,449 | Scribner | May 2, 1893 |
| 982,784 | Behrend | Jan. 31, 1911 |
| 2,278,489 | Rawlings | Apr. 7, 1942 |
| 2,835,834 | Steinegger | May 20, 1958 |

FOREIGN PATENTS

| 348,027 | France | Jan. 25, 1905 |
| 59,735 | Switzerland | Jan. 16, 1912 |